United States Patent
Fujieda

(10) Patent No.: US 9,710,945 B2
(45) Date of Patent: Jul. 18, 2017

(54) METHOD FOR CUTTING OUT CHARACTER, CHARACTER RECOGNITION APPARATUS USING THIS METHOD, AND PROGRAM

(71) Applicant: OMRON Corporation, Kyoto-Shi, Kyoto (JP)

(72) Inventor: Shiro Fujieda, Kyoto (JP)

(73) Assignee: OMRON Corporation, Kyoto (JP)

( * ) Notice: Subject to any disclaimer, the term of this patent is extended or adjusted under 35 U.S.C. 154(b) by 264 days.

(21) Appl. No.: 14/378,580

(22) PCT Filed: Nov. 28, 2012

(86) PCT No.: PCT/JP2012/080701
§ 371 (c)(1),
(2) Date: Aug. 13, 2014

(87) PCT Pub. No.: WO2013/121647
PCT Pub. Date: Aug. 22, 2013

(65) Prior Publication Data
US 2015/0015603 A1    Jan. 15, 2015

(30) Foreign Application Priority Data
Feb. 17, 2012  (JP) .................................. 2012-032888

(51) Int. Cl.
*G06K 9/34* (2006.01)
*G06T 11/60* (2006.01)
(Continued)

(52) U.S. Cl.
CPC ................ *G06T 11/60* (2013.01); *G06K 9/34* (2013.01); *G06K 9/348* (2013.01); *G06K 9/4647* (2013.01);
(Continued)

(58) Field of Classification Search
CPC .. G06K 2209/01; G06K 9/4647; G06K 9/033; G06K 9/22; G06K 9/348;
(Continued)

(56) References Cited

U.S. PATENT DOCUMENTS 5,243,668 A     9/1993  Kitamura et al.
5,761,344 A  *  6/1998  Al-Hussein ........ G06K 9/00456
                                               382/237
(Continued)

FOREIGN PATENT DOCUMENTS

EP        2 154 632 A2    2/2010
JP        9-282417 A     10/1997
JP        2010-044485 A   2/2010

OTHER PUBLICATIONS

International Search Report for corresponding International Application No. PCT/JP2012/080701, mailed Feb. 19, 2013 (1 page).
(Continued)

*Primary Examiner* — Kanjibhai Patel
(74) *Attorney, Agent, or Firm* — Osha Liang LLP

(57) ABSTRACT

A method for cutting out, from a gray-scale image generated by capturing an image of a character string, each character in the character string for recognition, includes a first step of repeating projection processing for projecting a highest or lowest gray level in a line along a direction crossing the character string in the gray-scale image, onto an axis along the character string, with the lowest gray level selected when a character in the gray-scale image is darker than a background, the highest gray level selected when the character in the gray-scale image is brighter than the background, and a projection target position moved along the character string.

8 Claims, 8 Drawing Sheets

(51) Int. Cl.
*G06K 9/46* (2006.01)
*G06K 9/03* (2006.01)

(52) U.S. Cl.
CPC ......... *G06K 9/033* (2013.01); *G06K 2209/01* (2013.01); *G06T 2210/22* (2013.01)

(58) Field of Classification Search
CPC ............. G06K 9/00442; G06K 9/2054; G06K 9/3283; G06K 9/72; G06K 9/34; G06T 11/60; G06T 2210/22; G01B 11/25
USPC .................................................. 382/177–179
See application file for complete search history.

(56) References Cited

U.S. PATENT DOCUMENTS

| | | | | |
|---|---|---|---|---|
| 6,289,123 | B1* | 9/2001 | Xiaomang | G06K 9/38 382/181 |
| 6,671,417 | B1* | 12/2003 | Koshinaka | G06K 9/3283 382/254 |
| 7,949,187 | B2* | 5/2011 | Nakamura | G06K 9/3283 358/1.11 |
| 2007/0274704 | A1* | 11/2007 | Nakajima | G06F 17/242 396/310 |
| 2008/0069447 | A1* | 3/2008 | Hotta | G06K 9/346 382/182 |

OTHER PUBLICATIONS

Extended European Search Report issued in corresponding European Application No. 12868760.5, mailed on Nov. 7, 2016 (8 pages).
Takahiro Fukushima et al.; "On-line Writing-box-free Recognition of Handwritten Japanese Text Considering Character Size Variations"; Proceedings of the 15th International Conference on Pattern Recognition; vol. 2; pp. 359-363; Sep. 2000 (5 pages).
Sargur N. Srihari et al.; "Research in Japanese OCR"; Handbook of Character Recognition and Document Image Analysis; pp. 357-380; 1997 (24 pages).
Richard G. Casey et al.; "A Survey of Methods and Strategies in Character Segmentation"; IEEE Transactions on Pattern Analysis and Machine Intelligence; vol. 18, No. 7; pp. 690-706; Jul. 1996 (17 pages).

* cited by examiner

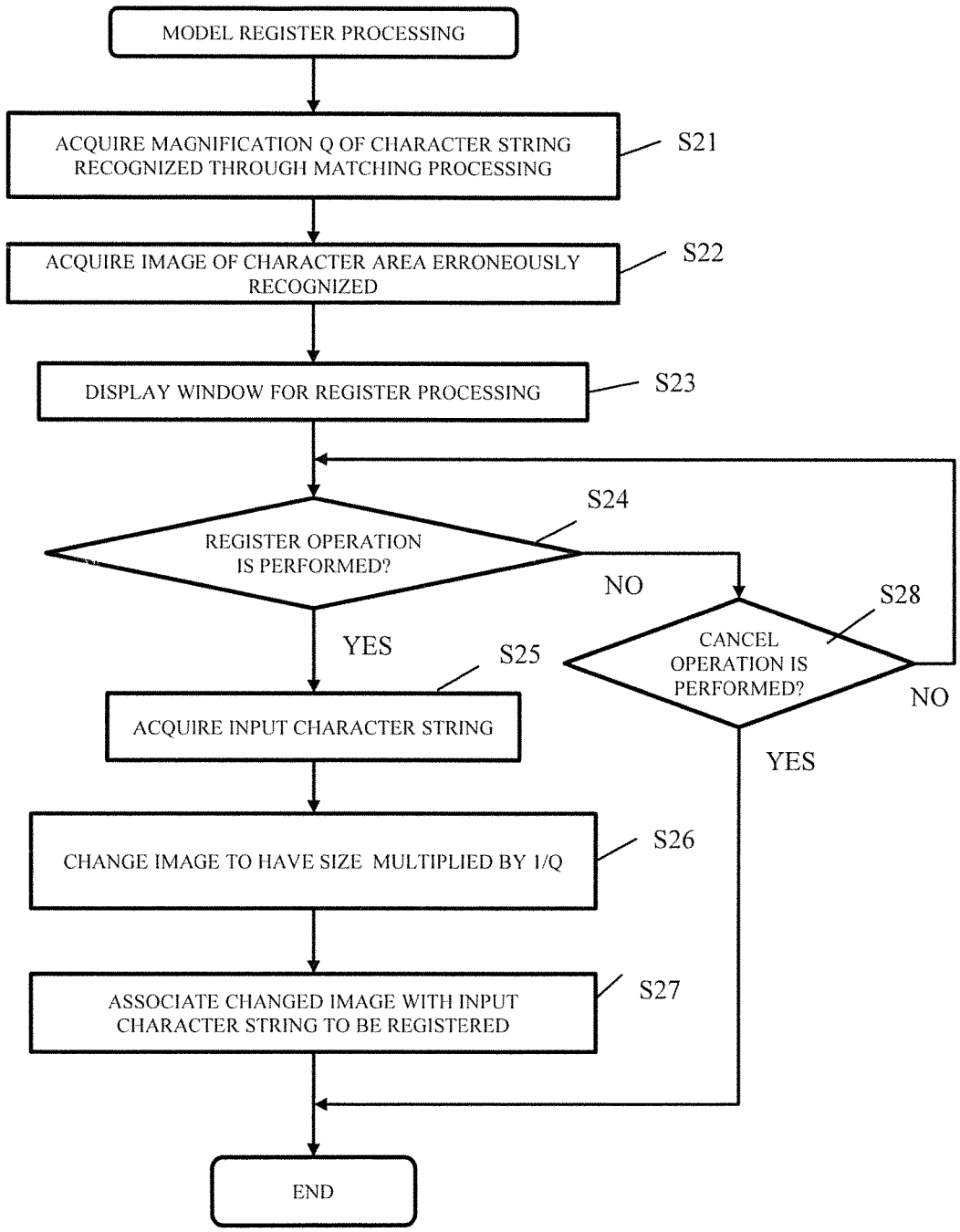

METHOD FOR CUTTING OUT CHARACTER, CHARACTER RECOGNITION APPARATUS USING THIS METHOD, AND PROGRAM

BACKGROUND

Technical Field

The present invention relates to processing for recognizing a character by image processing, and particularly relates to a technique for cutting out each character as a recognition target, from an image as a processing target.

Related Art

In character recognition processing, generally, characters are individually cut out from a gray-scale image generated by capturing an image of a character string. Then, matching processing (model matching) using various character models is performed on each character thus cut out, and thus the content of the character string is recognized. In processing for cutting out a character, binary data or gray-scale data of an image as the processing target is projected in x and y axis directions, and a portion corresponding to the character is extracted from a projected pattern generated for each axis. Thus, an area (hereinafter, referred to as "character area") corresponding to each character is specified.

As a prior art related to character recognition processing, Patent Literature 1 describes a technique, in which, from a gray level histogram obtained by the projection processing, the width of the cut out character is compared with the threshold. When the character width is larger than a threshold, it is determined that a plurality of characters might be in contract with each other, and thus cutting out is performed again (see paragraphs 0024 to 0027, and the like). Furthermore, the cutting out processing is performed again also when the reliability of a recognition processing result after the cutting out is low, or when an image as a matching target matches a model showing a part of a character (the left-hand side of a Kanji character and the like) (see paragraph 0037 and the like).

Patent Literature 2 describes a technique of calculating a matching reliability level by performing provisional matching processing after a character is cut out. A standard character length of a full-size character is determined based on a character candidate satisfying a condition such as having the matching reliability level not lower than a reference value. Half-size character cutting out processing based on the standard character length is performed on an area having the matching reliability level lower than a predetermined level (see paragraphs 0061 and 0078 to 0085, and the like).

PTL 1: Japanese Unexamined Patent Application Publication No. 1997-282417

PTL 2: Japanese Unexamined Patent Application Publication No. 2010-44485

SUMMARY

In general character cutout processing, a method for accumulating (binary or multi-value) image data in a single line along a projected direction is employed. However, when the unevenness in gray level in a background portion increases, due to a pattern, shading, or the like of a medium, on which a character string as a recognition target is printed, the difference between the background portion and a character portion in projection value decreases. Thus, the accuracy of the cutting out is degraded.

When the character string as the processing target has non-uniform pitch between characters or character widths, or when a space between the adjacent characters is small, the difference between the portion corresponding to a character and a portion corresponding to the background portion is unclear also in the projected pattern. Thus, the cutting out of a character might fail.

When such a failure of the processing for cutting out a character occurs, erroneous recognition occurs also in the matching processing thereafter. Thus, the accuracy of the character recognition is degraded.

Patent Literatures 1 and 2 describe technical ideas of performing recognition processing after a character is cut out, and the cutting out is performed again on a portion where the recognition accuracy is low. In such a method, the processing is complex and requires a long time. Thus, the method is not suitable for a use where higher speed processing is required.

One or more embodiments of the present invention stably performs high speed cutout processing by separating a character string into individual characters accurately, with simple processing.

A method for cutting out a character according to one or more embodiments of the present invention performs the following first, second, and third steps.

In the first step, projection processing for projecting a highest or lowest gray level in a line along a direction crossing the character string in the gray-scale image as a processing target, onto an axis along the character string, is repeated with the lowest gray level selected when a character in the gray-scale image is darker than a background, the highest gray level selected when the character in the gray-scale image is brighter than the background, and a projection target position moved along the character string In the second step, a local maximum value and a local minimum value are extracted from a projected pattern generated by the first step, and, between a variable range of the local maximum value and a variable range of the local minimum value, a straight line inclined in accordance with variation of the values, is set. In the third step, an image in a cut out target range in the gray-scale image is cut out with a range, in which a gray level higher than the straight line in the projected pattern is projected, set as the cut out target range when the highest gray level is projected in the first step, and a range, in which a gray level lower than the straight line in the projected pattern is projected, set as the cut out target range when the lowest gray level is projected in the first step According to the method described above, for example, in the projection processing of the first step, the lowest gray level in the line along the direction crossing the character string is projected onto the axis along the character string, when the processing target is an image, in which a character is darker than a background. By repeating the processing with the projection target position moved along the axis along the character string, the projected pattern, in which the portion corresponding to the character is a trough and a portion corresponding to a space between the characters is a peak, is obtained. The straight line set between the variable range of the local minimum values (character portion) and the variable range of the local maximum values (portion of space between characters) in the projected pattern is used as a reference for specifying a cut out target range. Thus, a reference value for the cutting out can be different among locations.

Thus, even for an image, in which a background has uneven gray scale level due to a pattern and the like, a straight line can be set at a position sufficiently spaced with respect to the variable range of the gray level. Even when a part of the character string is dark due to the shading and the like, the straight line inclined in accordance with the variation of the gray level can be set, and thus, the cut out target range for a character can be correctly determined at any position along the character string.

In one or more embodiments of the present invention, in the first step, for each of a plurality of lines included in a rotation range obtained when a line that is orthogonal to the axis along the character string and passes through the projection target position is rotated about a point in the line up to a predetermined angle, a gray level, in the line, corresponding to the selection between the highest gray level and the lowest gray level, is extracted, and when the highest gray level is selected, a minimum value of values extracted in the lines is projected onto the projection target position, and when the lowest gray level is selected, a maximum value of values extracted in the lines is projected onto the projection target position In a case where a single line crossing the character string is set as the target of the image capturing, in the character string, in which the space between the characters is narrow, a part of an adjacent character in the space portion between the characters might protrude into the space, and the protruded portion might be on the line as the projection target. Thus, the gray level of the character portion might be accidentally reflected. However, according to one or more embodiments of the present invention, in the projection processing for the space portion between the characters, a gray level extracted from a line, of a plurality of set lines, not crossing the image of the character cane be projected. Thus, higher character cut out accuracy can be achieved.

In one or more embodiments of the present invention, the straight line set in the second step is displayed together with the projected pattern generated by the first step, and a height or inclination of the straight line with respect to the projected pattern is changed in accordance with a change operation.

With this method, the user himself or herself can change the straight line to be in a state suitable for separating a group of the local maximum values and a group of the local minimum values with each other, while checking the relationship between the projected pattern and the straight line. Thus, higher character cut out accuracy can be achieved.

A character recognition apparatus according to one or more embodiments of the present invention has functions of inputting a gray-scale image generated by capturing an image of a character string as a recognition target, cutting out each character in the character string in the image, and then matching each cut out character against models registered in advance to recognize each character, Furthermore, to perform the method for cutting out a character described above, the character recognition apparatus includes: a projection processing means configured to repeat projection processing for projecting a highest or lowest gray level in a line along a direction crossing the character string in the gray-scale image as the recognition target, onto an axis along the character string with a projection target position moved along the character string; a straight line setting means configured to extract a local maximum value and a local minimum value from a projected pattern generated by the projection processing means, and set, between a variable range of the local maximum value and a variable range of the local minimum value, a straight line inclined in accordance with variation of the values; and a cutout processing means configured to cut out an image in a cut out target range in the gray-scale image with a range, in which a gray level higher than the straight line in the projected pattern is projected, is set as the cut out target range when the highest gray level is projected by the projection processing means, and a range, in which a gray level lower than the straight line in the projected pattern is projected, is set as the cut out target range when the lowest gray level is projected by the projection processing means The projection processing means is configured to select the lowest gray level when a character in the gray-scale image is darker than a background, and select the highest gray level when the character in the gray-scale image is brighter than the background.

The projection processing means of an embodiment of the character recognition apparatus described above, extracts, for each of a plurality of lines included in a rotation range obtained when a line that is orthogonal to the axis along the character string and passes through the projection target position is rotated about a point in the line up to a predetermined angle, a gray level, in the line, corresponding to the selection between the highest gray level and the lowest gray level, and when the highest gray level is selected, projects a minimum value of values extracted in the lines onto the projection target position, and when the lowest gray level is selected, projects a maximum value of values extracted in the lines onto the projection target position. According to this embodiment, the processing for cutting out the range corresponding to each character, in the direction along the character string, can be performed highly accurately.

A character recognition apparatus according to another embodiment further includes a change operation reception means configured to display the straight line set by the straight line setting means together with the projected pattern generated by the projection processing means, and receive an operation for changing a height or inclination of the straight line with respect to the projected pattern in an image in a displayed screen. The straight line setting means is provided with a function for changing the height or inclination of the straight line with respect to the projected pattern in accordance with the operation received by the change operation reception means. With this configuration, the user can change the reference straight line to improve the cut out accuracy, while checking the relationship between the projected pattern and the straight line that are displayed.

A character recognition apparatus according to still another embodiment further includes a designation input reception means configured to receive an input for designating one of the highest gray level and the lowest gray level to be selected by the projection processing means. With the means, the target of the projection can be changed in accordance with the bright/dark relationship between the character and the background portion in the image as the processing target, whereby higher usability can be achieved.

One or more embodiments of the present invention further provides a program for causing a computer to operate as a character recognition apparatus including the projection processing means, the straight line setting means, and the cutout processing means described above.

According to one or more embodiments of the present invention, the processing of cutting out each character from an image of a character string can be performed accurately with a simple procedure, and thus high speed character recognition processing can be achieved. Even when an image as a processing target includes noise produced by a complex pattern, shading, and the like, the processing can be stably performed without being affected by the noise.

BRIEF DESCRIPTION OF DRAWINGS

FIG. 8 is a flowchart showing a procedure of model registration processing.

DETAILED DESCRIPTION

Figure 1:
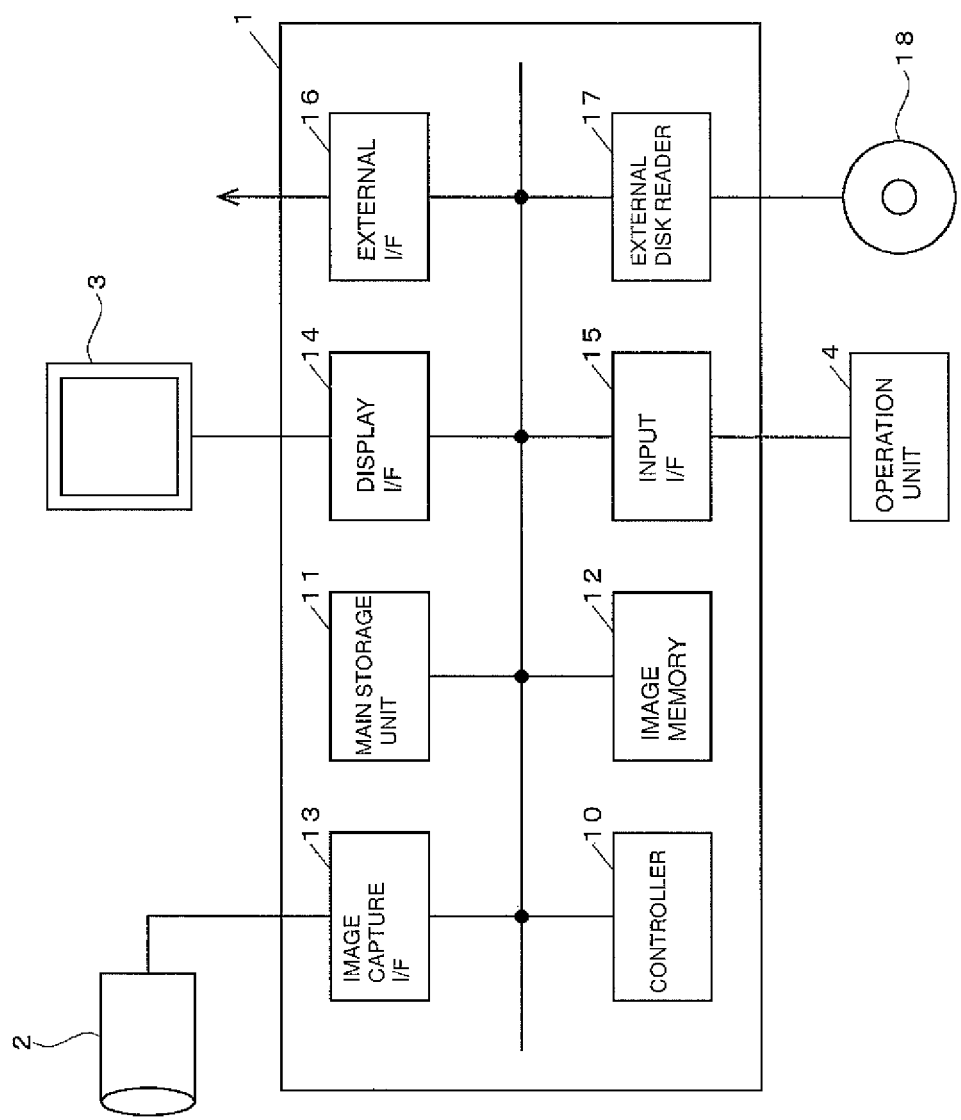
FIG. 1 is a block diagram showing a configuration example of a character recognition apparatus.

Embodiments of the present invention will be described with referenced to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. FIG. 1 shows a configuration example of a character recognition processing apparatus according to one or more embodiments of the present invention.

The character recognition processing apparatus captures an image of a character string, reads a character in the image thus generated, and outputs the reading result. The character recognition processing apparatus includes a main body unit 1 including a controller 10, a camera 2 for the image capturing, a display unit 3, an operation unit 4, and the like. The display unit 3 is formed of a liquid crystal monitor, for example, and the operation unit 4 includes a mouse and a keyboard.

The main body unit 1 is a general-purpose computer (personal computer) and includes the controller 10 including a CPU, and further includes a main storage unit 11, an image memory 12, an image capture interface 13, a display interface 14, an input interface 15, an external interface 16, an external disk reader 17, and the like.

As an example, the main storage unit 11 can be a hard disk, and an image memory 12 can be a RAM board. In the main control unit 11, a dedicated program read from an external disk 18 by the external disk reader 17, font data used for the character recognition processing, and the like are registered. An image output from the camera 2 is captured by the image capture interface 13 to be digitally converted, and the resultant image data is stored in the image memory 12.

The controller 10 is set to have a function of cutting out each character from the image stored in the image memory 12, and a function of recognizing the cut out character, with programs stored in the main storage unit 11. The controller 10 is also set to have a function as a graphical user interface to be provided to the user through these processing described above. With the graphical user interface, a screen including an image as a processing target is displayed on the display unit 3 through the display interface 14, and an operation through the operation unit 4 is received through the input interface 15.

In the character recognition processing apparatus of one or more embodiments of the present invention, after an operation for instructing reading of a character is received in a screen displaying an image as a processing target, the image is recognized with processing in FIG. 3 described later, and the recognition result is displayed on the screen. The recognition result may be output to an external apparatus through the external interface 16.

Figure 2:
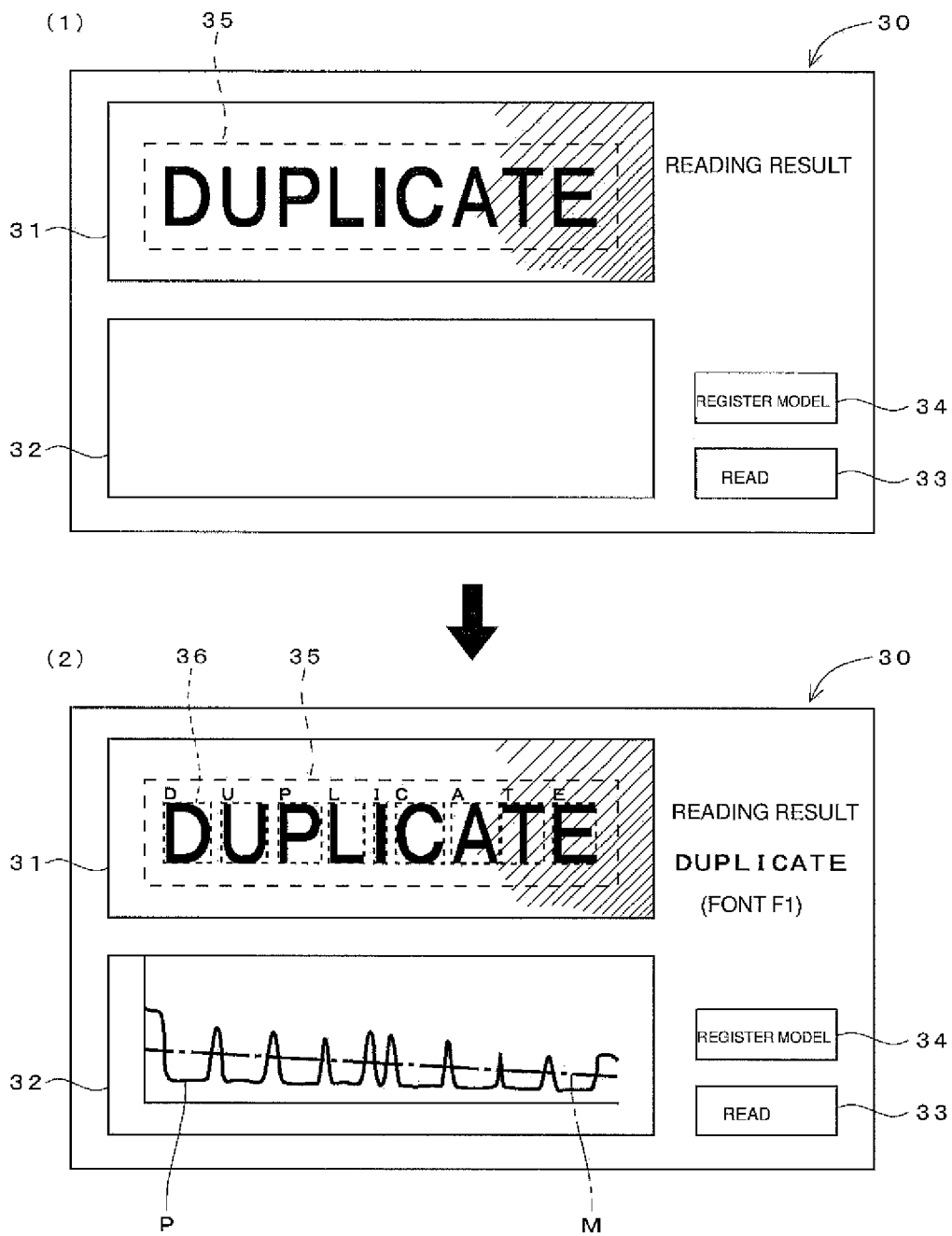
FIG. 2 is a diagram showing an example of a screen displayed in character recognition processing, together with change of the display in accordance with the processing.

FIG. 2 shows an example of a screen displayed on a display unit 3 for the character recognition processing.

A screen 30 of one or more embodiments of the present invention includes a display field 31 for an image of a character string as a recognition target, a display field 32 for an analysis result, a read button 33, a model registration button 34, and the like. In this example, the hatched lines represent the shade assuming that shading is produced in a right end portion of the image.

FIG. 2(1) is a screen before reading processing is initiated, a rectangular frame 35, indicating a processing target area set by a user, is displayed in the image in the image display field 31. The user sets the processing target area by determining the position and the size of the rectangular frame 35 by operating a mouse for example, and then operates the read button 33. In response to this operation, the controller 10 recognizes an area corresponding to the rectangular frame 35 as the processing target area, and performs the character recognition processing (including cutting out a character and matching processing) on the image within the area. Thus, the screen is changed as shown in FIG. 2(2).

In the image display field 31 of the screen 30 after the recognition processing, each character is surrounded by a frame 36 indicating a character area specified by the cutout processing. At an upper left position of each frame 36, a character read from an image in the frame 36 is displayed. In an empty space on the right side of the image display field 31, a character string derived from the recognition result of each character area is displayed as the reading result. Below the character string, the name (F1) of a font most suitable for the character string is displayed.

In the display field 32 for the analysis result, which has been in a blank state, a projected pattern P, generated by projection processing for cutting out a character, is displayed together with a straight line M (hereinafter, referred to as "reference straight line M") set as a reference for the cutting out.

The recognition processing, performed under an exemplary condition that the recognition target is a horizontally arranged character string with characters darker than the background, is described in detail below.

Figure 3:
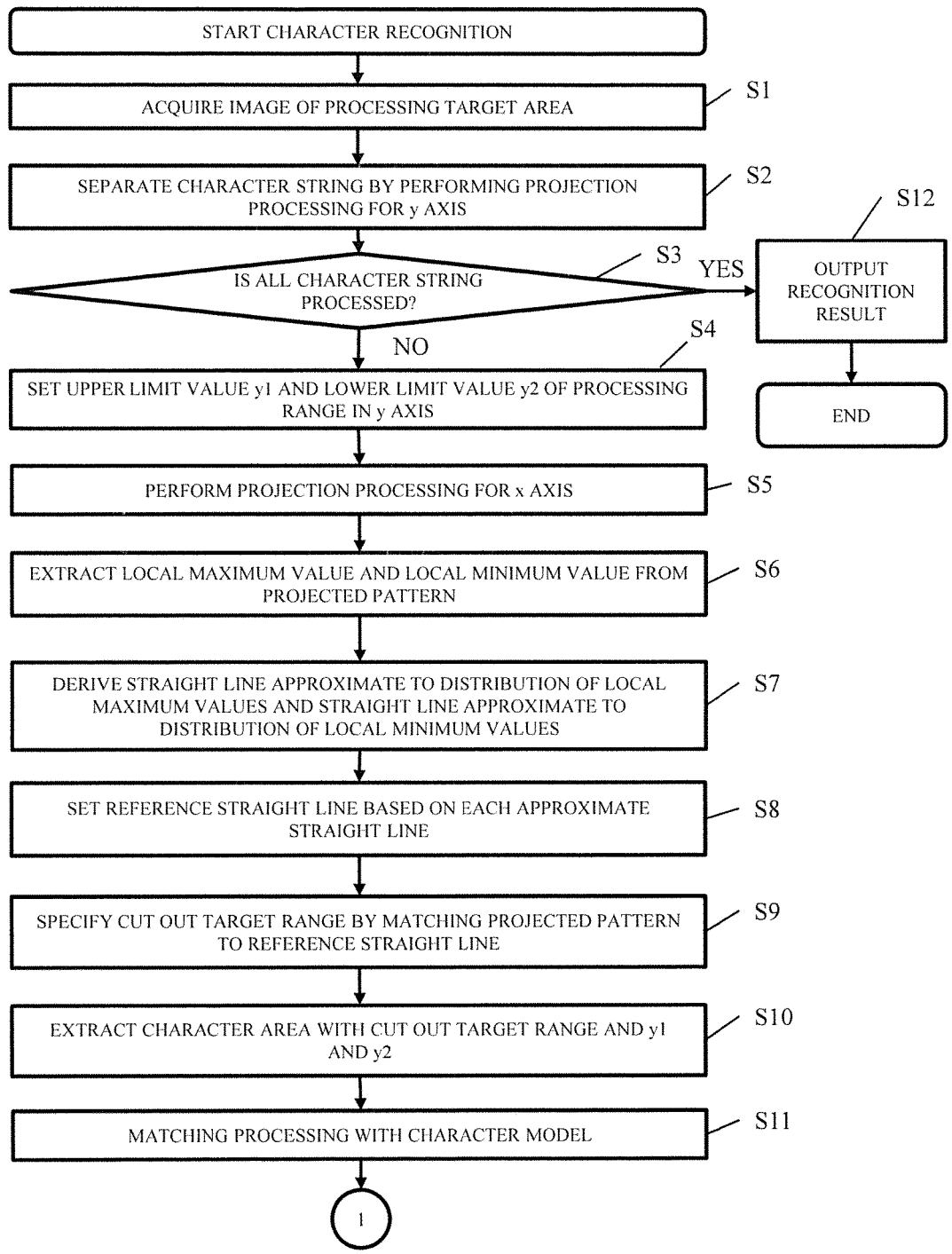
FIG. 3 is a flowchart showing a procedure of the character recognition processing.

FIG. 3 shows a schematic procedure of the processing performed by the controller 10 for the character recognition.

The processing starts when the processing target area is set with the screen shown in FIG. 2, and the read button 33 is operated. First, the controller 10 acquires an image in the processing target area, based on the position information of the rectangular frame 35 (Step S1).

In the example of FIG. 2, it is described that a range including the character string of a single line of text is designated. In actual cases, a range including character strings of more than one lines of text might be designated. In view of this point, in Step S2, first, the projection processing for the y axis is performed, and the character strings are separated into individual lines of text by the generated projected pattern (Step S2).

Thereafter, processing at and after Step S4 is performed with the separated character strings sequentially set as the processing target.

In Step S4, an upper limit value y1 and a lower limit value y2 of the processing range in the y axis are set, based on the result of the processing of separating the character strings (y1 and y2 are y coordinates slightly outside the range determined to correspond to the character string). In Step S5, the projection processing for the x axis is performed on an image within the range from y1 to y2.

When the projected pattern along the x axis direction is generated by the processing described above, in Step S6, local maximum and local minimum values are extracted from the projected pattern. In the subsequent Step S7, a straight line approximate to the distribution of the local maximum values and a straight line approximate to the distribution of the local minimum values are obtained. In Step S8, the reference straight line M for specifying the cut out target range is set, based on the two approximate straight lines.

In Step S9, values in the projected pattern are matched with the reference straight line M described above, to specify the cut out target range. Then, for each cut out target range, the character area is extracted based on the x coordinates of the left and the right edges of the range and the coordinates y1 and y2 indicating the processing target range in the y axis (Step S10), and the matching processing using character models in various pieces of font data is performed (Step S11).

Then, the processing returns to Step S3, and when there is an unprocessed character string ("NO" in Step S3), Steps S4 to S11 are performed on one unprocessed character string. When all the character strings are processed ("YES" in Step S3), the processing proceeds to Step S12 where the recognition result is output. With the output, the processing corresponding to an instruction from the user is completed.

In projection processing for the y axis (Step S2) of the processing described above, the lowest gray level in each line along the x axis within the processing target area is projected onto the line. Thus, from a line including a pixel of an image of a character, a gray level of the image of the character is projected, and the gray level of the background portion is projected from only a line including no image of the character. Thus, in the y axis direction, the range including the entire character string can be accurately extracted.

Figure 4:
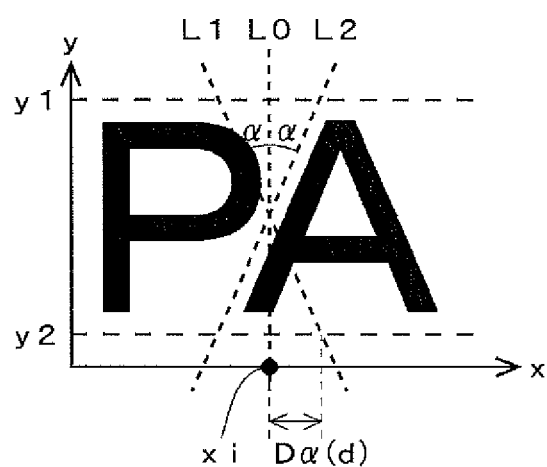
FIG. 4 is a diagram showing a concept of lines set for projection processing for a direction along a character string.

In the projection processing for the x axis along the character string (Step S5), a plurality of lines with different inclinations are set for each projection target position. The lowest gray level in each line is extracted, and the maximum value of the extracted lowest gray levels is used as the projection value. A method for setting the line is shown in FIG. 4. In the figure, xi is the x coordinate of the projection target position, and y1 and y2 respectively are the upper and the lower values of the processing range (obtained in Step S4).

The concept of the lines for projection set for the coordinate xi is described. The lines for the projection for the coordinate xi are lines generated while rotating a line L0, passing through the coordinate xi and being in parallel with the y axis, about the middle point between the point (xi, y1) and the point (xi, y2), leftward and rightward in the range up to a predetermined angle α. In an algorithm executed by the controller 10, the inclination of the line is changed by using a distance d from the coordinate xi at a position in the processing target range y1, y2 in the y axis direction. Thus, a maximum value Dα of the distance d is set instead of the angle α.

When the projection is performed only in the direction of the line L0 along the y axis as in normal projection processing, as shown in the example of FIG. 4, the space between the characters are narrow. Thus, adjacent character partly might protrude into the narrow space, and the protruded part might be on the line L0. Thus, when the lowest gray level in the line L0 along the y axis is projected onto xi, based on a method that is the same as the projection processing for the y axis, the gray level of the character is projected onto xi in the example of FIG. 4.

In view of this point, in one or more embodiments of the present invention, the lines of various inclinations are set, for each line, the lowest gray level in the line is extracted, and the maximum value in the extracted gray levels is used as the projection value to the coordinate xi. In an image, in which the background portion is brighter than the character, the lowest gray level, extracted in the line passing through a space portion only, is the maximum, as a line L2 in FIG. 4, and this highest gray level is projected onto the coordinate xi. Therefore, and thus a projected pattern reflecting the gray level in the space portion between the characters, and in which the portion corresponding to the character is a trough portion and a portion corresponding to the space portion is a peak portion, is generated.

Figure 5:
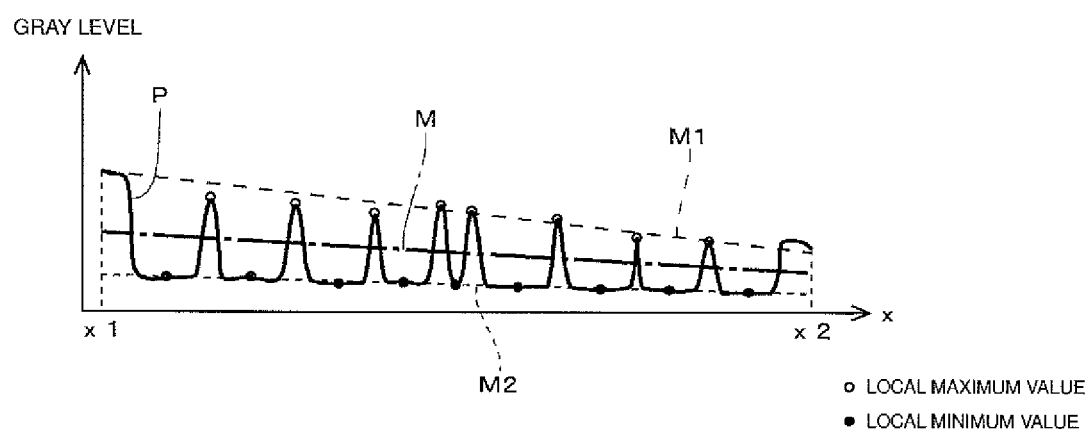
FIG. 5 is a diagram showing a method for setting a reference straight line for a projected pattern.

FIG. 5 shows an example of a projected pattern P generated by the projection processing described above (the horizontal axis represents an x coordinate and the vertical axis represents the gray level), together with a method for setting the reference straight line M.

M1 and M2 in the figure are approximate straight lines obtained in Step S7 in FIG. 3. As describe above, in this Step S7, the straight line M1, approximate to the variation of the local maximum value, and the straight line M2, approximate to the variation of the local minimum value, in the projected pattern are obtained. In the subsequent Step S8, for example, the x coordinate is moved by one at a time, and a combination of the points corresponding to the focused x coordinates in the straight lines M1 and M2 is obtained, and the middle point (obtained by the average value of the gray levels of the points) between the points is obtained. A straight line approximate to the distribution of the middle points is set, and this third approximate straight line is set as the reference straight line M.

A method for setting the reference straight line M is not limited to that described above. For example, the reference straight line M may be set by a simple method of obtaining the middle points between the corresponding point on the straight line M1 and the corresponding point on the M2 only for the coordinates x1 and x2 on both ends of the processing target, and connecting between the middle points. Furthermore, the height and the inclination of the straight line M may be determined based on the pattern of distribution of the local maximum values and the local minimum values, without setting the straight lines M1 and M2.

The projected pattern of FIG. 5 is the same as that shown in the field 32 in FIG. 2(2), and thus the description is given by referring back to FIG. 2(2). In the image as the recognition target in one or more embodiments of the present invention, the shading is produced in the right edge portion. Thus, at a portion more on the right side from the left side, the peak is lower and the difference between the peak portion and the trough portion representing the character is smaller. However, the reference curve M is inclined toward the lower right from the upper left, in accordance with the variation of the gray level. Thus, the reference straight line M is positioned at a position allowing the separation between the peak reflecting the space portion and the trough representing the character, also in a portion where the shading is produced. Thus, the range corresponding to each character can be cut out based on the reference straight line M, without being affected by the variation of the gray level caused by the shading.

Figure 6:
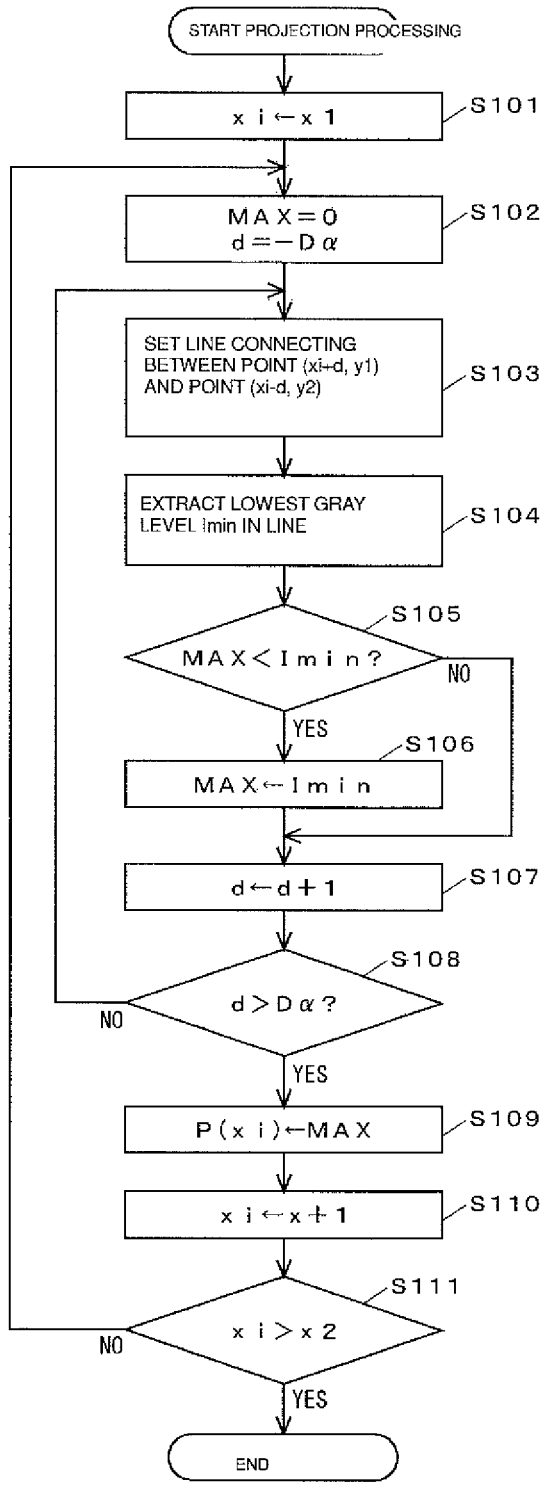
FIG. 6 is a flowchart showing a detailed procedure of the projection processing (Step S5 in FIG. 3) for the direction along the character string.

FIG. 6 shows a detailed procedure of the projection processing for the x axis (corresponding to Step S5 in FIG. 3). The procedure of the projection processing is described below with reference to FIGS. 4 and 5 described above, as well as this FIG. 6.

In FIG. 6, the coordinate of the projection target position on the x axis is defined as xi, to conform to the example of FIG. 4. The x coordinate x1 on the left edge of the processing target area is set as the initial value of this xi (Step S101). Thereafter, the following processing is performed while moving xi is by one pixel at a time (Steps ST110 and ST111) until xi reaches the x coordinate x2 on the right edge of the processing target area.

First, in Step S102, the maximum value MAX of the lowest gray levels is set to the initial value 0, and a displacement amount d is set to the initial value $-D\alpha$. When $D\alpha$ is a positive value, the initial value of d is a negative value.

In Step S103, a line connecting between a coordinate (xi+d, y1) and a coordinate (xi−d,y2) are set. With the initial values of xi and d set in Steps S101 and S102, the first line to be set is a line L1 in FIG. 4. When $d=D\alpha$ holds true, the line L2 in FIG. 4 is set.

Thus, d is incremented by 1 at a time until the displacement amount d reaches $D\alpha$ (Steps S107 and S108), and Step S103 is performed for d of each time. Thus, each time, a line of different inclination is set within the range between the lines L1 and L2. In Step S104, the lowest gray level 1 min in the set line is extracted. When Imin is larger than the maximum value MAX, MAX is updated by Imin (Steps S105 and S106). When 1 min is not larger than the maximum value MAX ("NO" in ST 105), MAX is maintained at a current value.

As described above, a plurality of lines different in inclination with each other are set for each point xi as the projection target, the lowest gray level in each line is obtained, and the maximum value MAX of the lowest gray levels is extracted. When all the lines are processed ("YES" in Step S108), the maximum value MAX at that point is set as the projection value P(xi) of the coordinate xi (Step S109).

When the processing described above is performed on the coordinate of each time, and xi is set to x2 as the end point so that the setting of the projection value described above is completed, "YES" is determined in Step S111 and the projection processing is completed.

In a case where the image, in which the character is brighter than the background, is the processing target, and thus is opposite to the above described example, in each line, the highest gray level in the line is extracted, and the minimum value of the extracted gray levels is selected as the projection value. Thus, a projected pattern, in which the portion corresponding to a character is a peak and the portion corresponding to a space portion is a trough, is generated. Also for this projected pattern, the two approximate straight lines M1 and M2 are set, through the method similar to that shown in FIG. 5, and the reference straight line M is set at the middle position between the straight lines M1 and M2. Still, the cut out target range is a range in the projected pattern, in which the gray level is higher than the reference straight line M.

A program for the recognition processing registered in the main storage unit 11 in FIG. 1 is configured to perform the processing for the image, in which the character is darker than the background. Alternatively, a program for performing the processing for the image, in which the character is brighter than the background, may be installed as well, and the recognition processing of which program is performed can be determined in accordance with the selection by the user.

In the example described above, the reference curve M is set at right in the middle of the range, in which the local maximum values are distributed, and the range, in which the local minimum values are distributed. Alternatively, the height of the reference straight line M may be adjusted by an offset value determined in advance.

Furthermore, in one or more embodiments of the present invention, the user may change the height or the inclination of the reference straight line M, by an operation of dragging the reference straight line in the field 32 in the screen shown in FIG. 2. Thus, when the automatic processing of cutting out a character fails, the user can change the reference straight line M based on the relationship between the peak and trough in the projected pattern in the field 32, and then operate the read button 33 again to obtain correct recognition result.

As described above, in one or more embodiments of the present invention, as long as there is a slight space between the characters, the space and the character can be accurately separated from each other. If there is a sufficient space between the characters, the character can be surely cut out accurately by the projection processing only in the direction along the y axis. In view of this point, a program for a simple projection mode of performing the projection processing only in the direction along the y axis and a program for a detailed projection mode for performing the projection processing shown in FIG. 6 may be registered in the main storage unit 11, and the user may be allowed to select the mode to be performed, in accordance with the state of the character string as the recognition target.

However, in both the simple projection mode and the detailed projection mode, a value corresponding to the number of pixels corresponding to the character in a line is not projected, and the gray level of the image of the character is projected. Thus, when the adjacent characters are in contact with each other, the adjacent characters cannot be separated into individual characters.

For example, in the character string of the small letters (such as "tt" and "rt") in the European language, the characters might be connected to each other. Thus, the character string of such a configuration needs to be correctly recognized.

Figure 7:
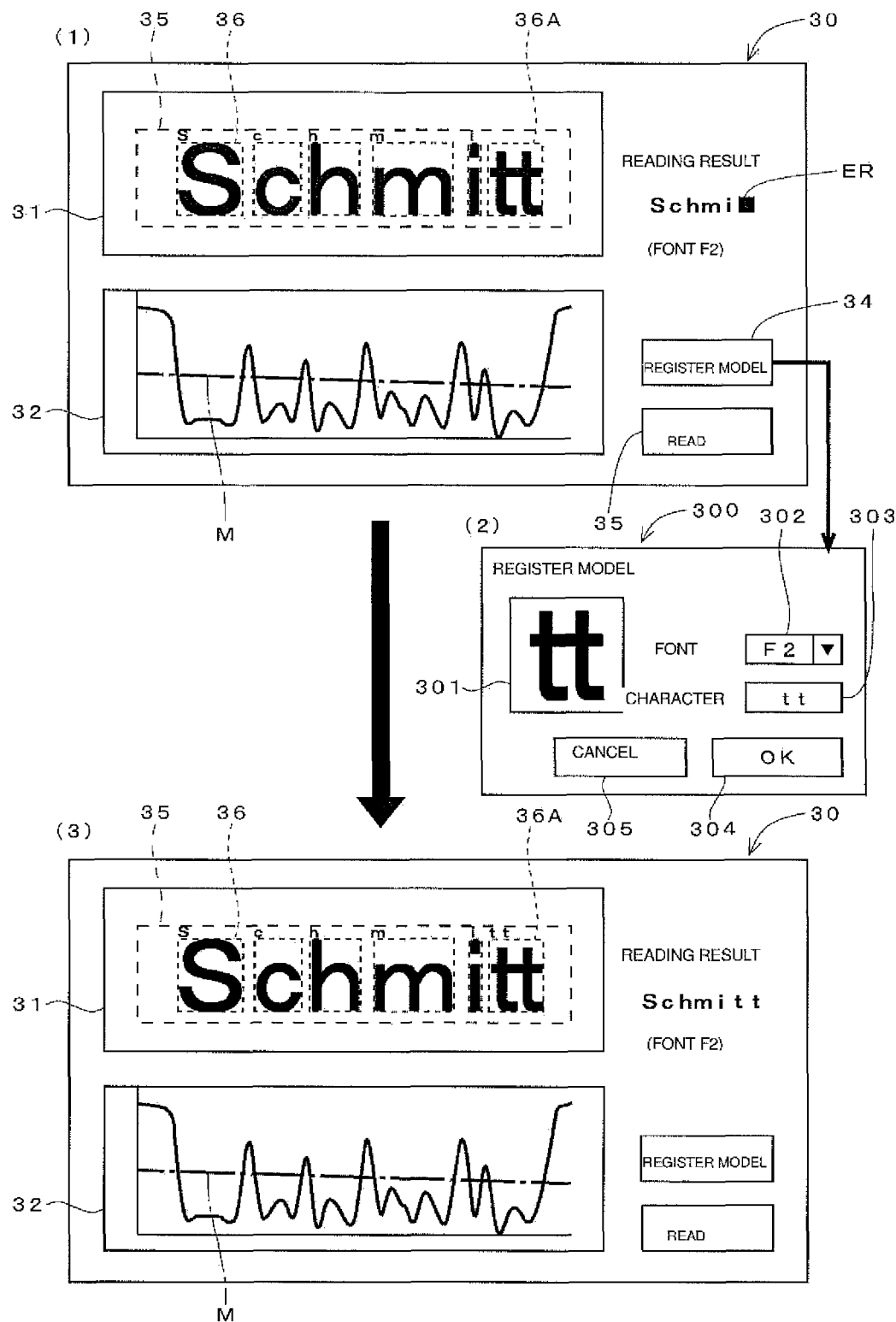
FIG. 7 is a diagram showing an example of each of a screen in a case where erroneous recognition has occurred in the character recognition, a register window for registering an image in a character area, in which the erroneous recognition has occurred, and a screen showing the result of the recognition processing performed again after the registration.

FIG. 7 shows an exemplary case where the processing is performed on a character string, in which the word "Schimitt" with two "t"s in the end of the string connected with each other, is displayed on the screen 30 having the same configuration of FIG. 2.

The screen in FIG. 7(1) is a display example of a stage where the processing shown in FIG. 3 described above is performed in response to the operation on the read button 35, and the reading result is displayed. As in the example of FIG. 2(2), the frame 36 indicating the character area specified by the cutout processing and the recognized character are displayed on the image display field 31. As shown in a frame 36A in the figure, a range including "tt" at the end of the character string is extracted as a single character area. The displayed reading result indicates, with a sign ER, that there is no character corresponding to the frame 36A.

When such erroneous recognition occurs, in a user interface of one or more embodiments of the present invention, the model registration button 34 is operated and thus a window 300 for registering a model is called. On the window 300, a combo box 302 for designating the font as a registration destination, an input box 303 for the character string corresponding to the image, an OK button 304, a cancel button 305 are displayed, in addition to an image 301 extracted from the erroneously extracted character area (corresponding to the frame 36A).

When the user inputs the character string corresponding to the image 301 in the field 303, and operates the OK button 304, the controller 10 associates the image 301 with the input character string to be registered. In the combo box 302, a font (F2) recognized by the matching processing is automatically set, but the user can freely change this setting and change the registration destination.

After the registration processing, when the user operates the read button 35 on the original screen 30 again, the controller 10 performs the processing in FIG. 3 again. FIG. 7(3) shows a screen on which the result of the recognition processing performed again is displayed. Through the matching against the models registered in advance, "tt" is also correctly recognized.

FIG. 8 shows a procedure, as the model registering processing described above, performed by the controller 10.

The processing starts when, after the processing described above shown in FIG. 3, the model registration button 34, in the screen 30 showing the processing result, is operated.

First, a magnification Q of the character string as the recognition target, with respect to the character model, and an image of the character area in which the erroneous recognition has occurred, are acquired (Steps S21 and S22). In the matching processing, a plurality of magnifications of the character string are set, and the matching to the image in the character area is performed with each magnification. The character model with the highest similarity is fit in the character area, and the magnification of the character model matching the character area is recognized as the magnification Q.

The acquisition of an image in Step S22 is not limited to the automatic processing, and the image in the selected may be captured in response to the operation of the user to select one of the cut out character areas.

In Step S23, the window 300 for registration processing showing the magnification Q and the image described above is opened. When a character string is input to the input field 303 in the window 300 and the OK button 304 is operated, ("YES" in Step S24), the character string input in the field 303 is acquired (Step S25).

In Step S26, the acquired image is multiplied by 1/Q so that the size of the image matches the size of the font data as the registration target (Step S26), and the image as a result of size change is associated with the input character string to be registered (Step S27).

When the cancel button 305 is operated after the window 300 is opened ("NO" in Step S24, and "YES" in Step S28), the window 300 is closed and the processing is terminated.

Through the registration processing described above, as shown in FIG. 7(3), even in a portion where a plurality of characters are connected with each other, each character can be correctly read. Thus, even higher usability can be achieved.

The model registration processing can be performed also in a character recognition processing apparatus that cuts out a character with general projection processing.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 1 main body unit
2 camera
3 display unit
4 operation unit
10 controller
11 main storage unit
30 screen
P projected pattern
M reference straight line

The invention claimed is:

1. A method for cutting out, from a gray-scale image generated by capturing an image of a character string, each character in the character string for recognition, the method comprising:
   a first step of repeating projection processing for projecting a highest or lowest gray level in a line along a direction crossing the character string in the gray-scale image, onto an axis along the character string, with the lowest gray level selected when a character in the gray-scale image is darker than a background, the highest gray level selected when the character in the gray-scale image is brighter than the background, and a projection target position moved along the character string;
   a second step of extracting a local maximum value and a local minimum value from a projected pattern generated by the first step, and setting, between a variable range of the local maximum value and a variable range of the local minimum value, a straight line inclined in accordance with variation of the values; and
   a third step of cutting out an image in a cut out target range in the gray-scale image with a range, in which a gray level higher than the straight line in the projected pattern is projected, set as the cut out target range when the highest gray level is projected in the first step, and a range, in which a gray level lower than the straight line in the projected pattern is projected, set as the cut out target range when the lowest gray level is projected in the first step.

2. The method for cutting out a character according to claim 1,
   wherein, in the first step, for each of a plurality of lines included in a rotation range obtained when a line that is orthogonal to the axis along the character string and passes through the projection target position is rotated about a point in the line up to a predetermined angle, a gray level, in the line, corresponding to the selection between the highest gray level and the lowest gray level, is extracted, and
   wherein, when the highest gray level is selected, a minimum value of values extracted in the lines is projected onto the projection target position, and wherein, when the lowest gray level is selected, a maximum value of values extracted in the lines is projected onto the projection target position.

3. The method for cutting out a character according to claim 1 further comprising a step of displaying the straight line set in the second step together with the projected pattern generated in the first step, and changing a height or inclination of the straight pattern in accordance with a change operation.

4. A character recognition apparatus configured to input a gray-scale image generated by capturing an image of a character string as a recognition target, cut out each character in the character string in the image, and then match each cut out character with models registered in advance to recognize each character, the apparatus comprising:
   a projection processor that repeats projection processing for projecting a highest or lowest gray level in a line along a direction crossing the character string in the gray-scale image as the recognition target, onto an axis along the character string, with a projection target position moved along the character string;
   a straight line setting unit that extracts a local maximum value and a local minimum value from a projected pattern generated by the projection processor, and sets, between a variable range of the local maximum value and a variable range of the local minimum value, a straight line inclined in accordance with variation of the values; and
   a cutout processor that cuts out an image in a cut out target range in the gray-scale image with a range, in which a gray level higher than the straight line in the projected pattern is projected, set as the cut out target range when the highest gray level is projected by the projection processor, and a range, in which a gray level lower than the straight line in the projected pattern is projected, set as the cut out target range when the lowest gray level is projected by the projection processor,
   wherein the projection processor selects the lowest gray level when a character in the gray-scale image is darker than a background, and selects the highest gray level when the character in the gray-scale image is brighter than the background.

5. The character recognition apparatus according to claim 4,
   wherein the projection processor extracts, for each of a plurality of lines included in a rotation range obtained when a line that is orthogonal to the axis along the character string and passes through the projection target position is rotated about a point in the line up to a predetermined angle, a gray level, in the line, corresponding to the selection between the highest gray level and the lowest gray level,
   wherein, when the highest gray level is selected, the projection processor projects a minimum value of values extracted in the lines onto the projection target position, and
   Wherein, when the lowest gray level is selected, the projection processor projects a maximum value of values extracted in the lines onto the projection target position.

6. The character recognition apparatus according to claim 4 further comprising:
   a change operation reception unit that displays the straight line set by the straight line setting unit together with the projected pattern generated by the projection processor, and receive an operation for changing a height or inclination of the straight line with respect to the projected pattern in an image in a displayed screen,
   wherein the straight line setting unit changes the height or inclination of the straight line with respect to the projected pattern in accordance with the operation received by the change operation reception unit.

7. The character recognition apparatus according to claim 4 further comprising a designation input reception unit that receives an input for designating one of the highest gray level and the lowest gray level to be selected by the projection processor.

8. A program stored on a non-transitory computer-readable medium causing a computer to function as a character recognition apparatus configured to cut out, from a gray scale image generated by capturing an image of a character string and input to the computer, each character in the character string in the image, and then match each cut out character with models registered in advance to recognize each character, the program causing the computer to perform:
   projection processing for projecting a highest or lowest gray level in a line along a direction crossing the character string in the gray-scale image, onto an axis along the character string with a projection target position moved along the character string;
   extracting a local maximum value and a local minimum value from a projected pattern generated by the projection processing, and setting, between a variable range of the local maximum value and a variable range of the local minimum value, a straight line inclined in accordance with variation of the values; and
   cutting out an image in a cut out target range in the gray-scale image with a range, in which a gray level higher than the straight line in the projected pattern is projected, set as the cut out target range when the highest gray level is projected by the projection processing, and a range, in which a gray level lower than the straight line in the projected pattern is projected, set as the cut out target range when the lowest gray level is projected by the projection processing.

* * * * *